United States Patent [19]

Lundberg et al.

[11] Patent Number: 4,778,986

[45] Date of Patent: Oct. 18, 1988

[54] ELECTRIC CONTROL ARRANGEMENT FOR USE IN OBJECT DETECTING SYSTEM WITH HIGH AND LOW INTENSITY LIGHT

[76] Inventors: Jan O. Lundberg, Skebokvarnsvägen 137, 124 35 Bandhagen; Thord A. G. Nilson, Enevägen 18, 153 00 Järna, both of Sweden

[21] Appl. No.: 9,214

[22] Filed: Jan. 30, 1987

[30] Foreign Application Priority Data

Jan. 30, 1986 [SE] Sweden ................................ 8600407

[51] Int. Cl.[4] ......................... H01J 40/14; G01N 9/04

[52] U.S. Cl. ............................. 250/223 R; 250/214 B; 250/222.2

[58] Field of Search ............... 250/223 R, 214 B, 561, 250/222.2, 222.1, 221

[56] References Cited

U.S. PATENT DOCUMENTS

| | | | |
|---|---|---|---|
| 3,739,177 | 6/1973 | Ko | 250/214 B |
| 4,196,811 | 4/1980 | Pilesi et al. | 250/223 R |
| 4,217,491 | 8/1980 | Dufford, Jr. et al. | 250/223 R |
| 4,366,378 | 12/1982 | Simons | 250/214 B |
| 4,450,352 | 5/1984 | Olsson | 250/223 R |
| 4,540,887 | 9/1985 | Minerd et al. | 250/223 R |
| 4,681,432 | 7/1987 | Kawabata et al. | 250/214 B |

*Primary Examiner*—David C. Nelms
*Assistant Examiner*—Michael Messinger
*Attorney, Agent, or Firm*—Burns, Doane, Swecker & Mathis

[57] ABSTRACT

The invention relates to an electric control arrangement intended for use with object detecting systems, which include, inter alia, a light source (2) intended for transmitting light beams in a direction in which an object (3) to be detected can be expected to appear, at least one receiver unit (4, 5) for receiving light beams reflected by a detected object, and electrical and/or electronic devices for evaluating and detecting the presence of the object in response to variations that occur in the received reflected light beams as a result of relative movement between the object (3) to be detected and light beams (2*a*) transmitted by the light source. It is proposed in accordance with the invention that the light source (2) is arranged to transmit the light beams with an intensity which can be varied in time, and that the receiver unit (4, 5) receiving the reflected light beams is controlled in a manner such that reception takes place under those time periods in which the light source (2) transmits light of high intensity and also during those time periods in which the light source (2) transmits light (2*a*) of low intensity.

20 Claims, 2 Drawing Sheets

ELECTRIC CONTROL ARRANGEMENT FOR USE IN OBJECT DETECTING SYSTEM WITH HIGH AND LOW INTENSITY LIGHT

TECHNICAL FIELD

The present invention relates to an electric control arrangement, and more specifically, although not exclusively, to an electric control arrangement intended for use with object detecting systems.

The electric control arrangement according to the invention is particularly intended for use with apparatus systems of the kind that include, inter alia, a light source which is intended to transmit light beams in a direction in which an object to be detected can be expected to appear, at least one, preferably two, receiver units for receiving light beams reflected from a detected object, and electrical and/or electronic devices for detecting and evaluating the presence of said object in accordance with variations caused in the received reflected light beams by relative movement between the object to be detected and the transmitted light beams.

The present invention is particularly adapted for application when counting objects which are orientated in a fishscale formation, e.g. for counting the numbers of printed matter, such as newspapers, discharged in mutually overlapping relationship from a printer.

BACKGROUND PRIOR ART

The U.S. Pat. No. 4,450,352 discloses an electric control arrangement which is intended for use with object detecting systems for counting newspapers orientated in fishscale formation. This prior known system includes a light source in the form of a laser beam, two receiver units which receive light reflected from the object, and electrical or electronic devices for evaluating and detecting the presence of separate newspapers in accordance with variations in the received reflected light beams, therewith counting the number of newspapers that pass through the object detecting system.

The arrangement illustrated and described in the U.S. Pat. No. 4,217,491 also forms part of the known prior art, this known arrangement comprising an electro-optical device which is positioned above a stream of transported units or objects, in order to detect the passage of each unit, by projecting a light beam onto the units and measuring the reflection of the light beams at two mutually different angles.

SUMMARY OF THE INVENTION

Technical Problems

In view of the known prior art in this field as set forth above it will be evident, as practical applications indicate, that one particular technical problem resides in the provision of simple object detecting systems which can be said to be independent, or in all events essentially independent of variations in the surrounding or ambient light, hereinafter referred to as stray light.

It will also be seen that a further technical problem resides in the perception that independency of stray light is achieved by varying the light intensity of the light beams transmitted from the light source.

Another technical problem resides in perceiving that the stray light independency is first achieved when the light reflected is detected both at high light intensities and at low light intensities.

Still a further technical problem will be seen to reside in perceiving that the resllts of these detections shall be used to produce a bandwidth-restricted signal differential.

Another qualified technical problem with regard to electric control arrangements of the aforesaid kind intended for use in object detecting systems is one of creating conditions which will not only render the system insensitive to stray light but which will also enable the system to be composed of simple light units, so that the system can be produced at low cost.

A further technical problem in this regard resides in the construction of an electric control arrangement for object detecting systems which is not only insensitive to stray light and capable of being composed of simple standard units, but which can also use an inexpensive light source which is capable of varying the intensity of the transmitted light beams in a predetermined manner with the aid of simple control circuits.

It will also be seen that a technical problem resides in the provision of an electric control arrangement of the aforesaid kind which solves the aforesaid technical problems and in which conditions are provided in the electrical and/or electronic devices which enable the reflected light beams received to be evaluated in a manner such that the signal information carried by the reflected light beams can be used to establish unambiguously the transition from one object to another.

A further technical problem resides in the provision of signal processing conditions which will enable the information carried by the reflected light beams to be evaluated unambiguously, particularly when two or more reflected light beam receiver units are used in the object detecting system to form a quotient relating to the difference between two signals obtained from the receiver units receiving said reflected light beams.

It will also be seen that a further technical problem resides in the provision, with the aid of simple means, of conditions which will enable a significant signal indicative of the object to be obtained from the difference signal, despite the presence of stray light of considerable intensity.

SOLUTION

The present invention relates to an electric control arrangement intended for use with an object detecting system of the kind which includes, inter alia, a light source that is intended to transmit beams of light in a direction in which an object to be detected can be expected to appear, at least one, normally two, receiver units for receiving light beams reflected by said object, and electrical and/or electronic devices which are effective in evaluating and detecting the presence of the object in response to variations occurring in the received reflected light beams as a result of relative movement between the object to be detected and the transmitted light beams.

In accordance with the invention it is proposed in the case of such control arrangements that the light source is constructed to transmit light beams with a light intensity that can be varied in time; and in that the receiver units are controlled, or otherwise influenced, in a manner such that reception is able to take place during those time periods in which the light source transmits light of high intensity, preferably during those time periods when the light source transmits light of the highest intensity, and also during those periods of time in which the light source transmits light of low intensity. In addition, the signals obtained from the received light beams of high and low light intensities shall be combined by subtraction, so as to produce a band-width restricted differential signal.

A particular advantage is afforded when the light source is adapted for periodic intensity variation.

According to one preferred embodiment of the invention the light source comprises an inexpensive and conventionally available light emitting diode (LED).

Conveniently, the light source is one which can be driven by a simple multivibrator, which may be arranged to produce a trigger pulse for activating respective receiver units.

With regard to the signals obtained from the units receiving the reflected light beams it is proposed in accordance with the invention that a first receiver unit is arranged to co-act with means for producing a true-phase-signal and a signal which is phase shifted through 180°, these signals being added together subsequent to activation of a respective signal input device by a trigger pulse.

In accordance with one advantageous embodiment of the invention the arrangement includes a second trigger receiver unit for receiving reflected light beams, this second receiver unit being arranged to co-act with means for producing a true-phase-signal and a signal which is phase-shifted through 180°, said signals being added together subsequent to activation of respective signal input devices by trigger pulses.

These addition signals are preferably subjected to integration and amplification.

In accordance with a further advantageous embodiment of the invention the momentary occurring absolute values of the aforesaid addition signals are subjected to division in a signal computing unit, so as to produce a division signal which exhibits momentarily occurring high values, which are utilized to establish a transition from a first object to a second object, or a transition from no object to an object, or from an object to no object, depending on whether the objects to be detected are oriented in a fishscale formation or on whether the objects are expected to be mutually apart.

ADVANTAGES

The advantages primarily afforded by an electric control arrangement in accordance with the present invention reside in the creation of possibilities of readily detecting separate objects, particularly newspapers oriented in fishscale formation, without detection of the objects being influenced to any serious extent by a strong stray light, not even when the objects present a printed upper surface, which in prior known object detecting systems could be discerned as a transition from one object to another.

The primary characterizing features of an electric control arrangement according to the present invention are set forth in the characterizing clause of the following claim 1.

BRIEF DESCRIPTION OF THE DRAWINGS

An embodiment at present proposed and exhibiting the features characteristic of the present invention will now be described in more detail with reference to the accompanying drawings in which.

DESCRIPTION OF AN EMBODIMENT AT PRESENT PREFERRED

Figure 1:
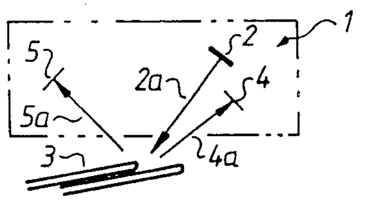
FIG. 1 illustrates in side view the principles according to which a prior art object detecting system operates, the system comprising a light source for transmitting light beams in a direction in which an object to be detected can be expected to appear, and two receiver units for receiving light beams reflected from a detected object.

FIG. 1 illustrates in side view an object detecting system 1 comprising, inter alia, a light source 2 which is operative to transmit beams of light in a direction in which an object 3 to be detected can be expected to appear.

The system illustrated in FIG. 1 also includes two receiver units 4, 5 for receiving light beams that are reflected from the detected object 3, the light beams reflected onto the receiver 4 being referenced 4*a*, while the light beams reflected onto the receiver 5 are referenced 5*a*.

Although the present invention does not necessarily require the presence of two mutually spaced receiver units in certain applications, the presence of two receiver units that are spaced apart is considered more suitable, since it is then possible to eliminate signal variation deriving from the print pattern or type of print on the object being detected, thereby affording more positive detection.

The one unit 5, however, shall be positioned so that the light beam 2*a* is broken when the object 3 passes the point at which detection is to take place.

The detection system 1 also includes electrical and/or electronic devices or means (not shown in FIG. 1) for evaluating and detecting the presence of an object in response to variations in the received reflected light beams caused by relative movement between the detected object 3 and the light beams 2*a* transmitted from the light source.

Figure 2:
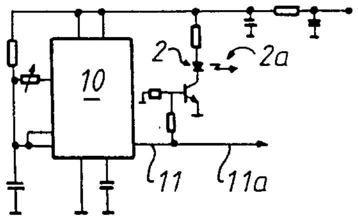
FIG. 2 is an electric circuit for operating the light source of an electric control arrangement according to the invention.

FIG. 2 illustrates a control circuit according to the invention which enables the light source 2 to transmit a light beam 2*a* with an intensity which varies in time.

According to one preferred embodiment of the invention, the light source is constructed for periodic intensity variation and the actual light source is a light emitting diode, also designated LED.

In order to produce an intensity which is periodically variable in time there is used a multivibrator 10 which transmits, on a conductor 12, square pulses of frequencies from 500 Hz to 500 kHz. The multivibrator 10 of the illustrated embodiment, however, is assumed to transmit at a frequency of 30 kHz.

Accordingly, in this latter case, the light source 2 will generate a light beam 2a with a periodic intensity variation that follows a frequency of 30 kHz.

The signal occurring on the conductor 11 from the multivibrator 10 is applied, on a conductor 11a, to the units 4, 5 receiving the reflected light beams as a trigger pulse for activation of said units.

Figure 3:
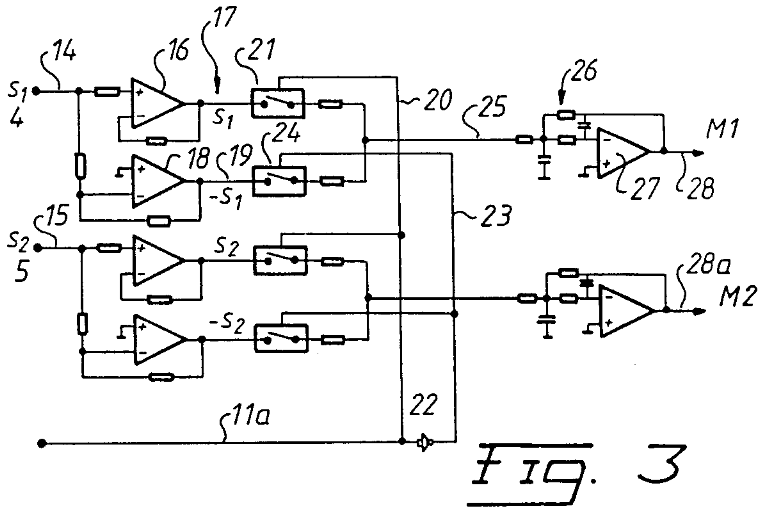
FIG. 3 is an electric circuit through which significant signals for two receiver units for receiving reflected light beams are produced.

As illustrated in FIG. 3, signals deriving from the light beam receiving unit 4 appear on the conductor 14, whereas signals deriving from the light beam receiving unit 5 appear on the conductor 15.

The signal appearing on the conductor 14 is referenced "S1", whereas the signal appearing on the conductor 15 is referenced "S2".

Since the two signals appearing on the conductors 14 and 15 are processed in an identical manner in the subsequent control circuit, the following description is made with reference solely to the processing of signal "S1" appearing on the conductor 14.

The signal "S1" is applied to a first amplifier 16 and exits therefrom on a conductor 17 as a phase-true amplified first signal "S1". The signal on the conductor 14 is also applied to an amplifier 18, which is connected so that there occurs on the conductor 19 a similarly amplified second signal "−S1" which is phase-shifted through 180° in relation to the first signal.

Accordingly, the signal on conductor 17 is referenced "S1", and the signal on the conductor 19 is referenced "−S1".

The activating or trigger pulse occurring on the conductor 11a is applied to a first signal input device 21, via a conductor 20. The trigger pulse is also applied to a second signal input device 24, via an inverting circuit 22 and a conductor 23.

The operational state of the input devices 21 and 24 is dependent on the frequency and the level of the trigger pulse, and activation of the inputs is therefore spaced in time.

If the signal on conductor 14 is high or low, the signal will pass through the amplifier 16 and the input device 21 during a first time period, whereas signals pass through the amplifeer 18 and the input device 24 during a second time period. Because the signal on conductor 19 is phase shifted, both of the signals afford a common contribution to the downstream integrating circuit 26, which comprises resistances and capacitances and an amplifier 27.

In this case stray light will occur as a slowly varying voltage. Consequently, the contributions afforded by the stray light, via the amplifier 18, will be substracted from each other via the input devices 21 and 24 and will provide alternate positive and negative contributions through the integrating circuit 26.

Consequently, the stray light will not have a detrimental effect on the output signal on the conductor 28. The signal exiting from the integrating circuit 26, with amplifier 27, constitutes a first significant signal M1 occurring on the conductor 28.

The above functional description also applies to the signal "S2" appearing on the conductor 15, this signal forming a second significant signal M2, via a conductor 28a.

Figure 4:
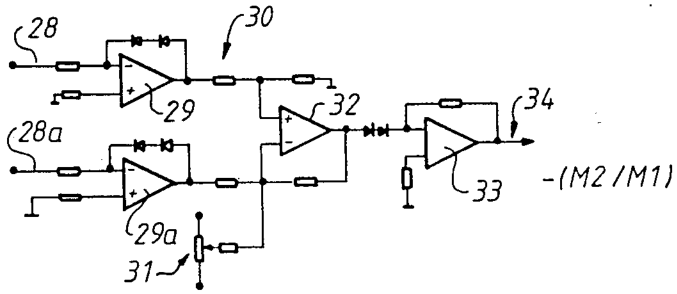
FIG. 4 is an electric circuit in which two significant signals are used to form a quotient between the significant signals in a signal computing circuit.

FIG. 4 is a circuit diagram of a signal processing circuit 30. This circuit includes an amplifier 29 for signals appearing on the conductor 28, and an amplifier 29a for signals appearing on the conductor 28a.

The reference 31 identifies an amplification control device which is connected to an amplifier 32, said amplifier together with an amplifier circuit 33 being intended to form, on a conductor 34, a signal that corresponds to −(M2/M1).

Figure 5:
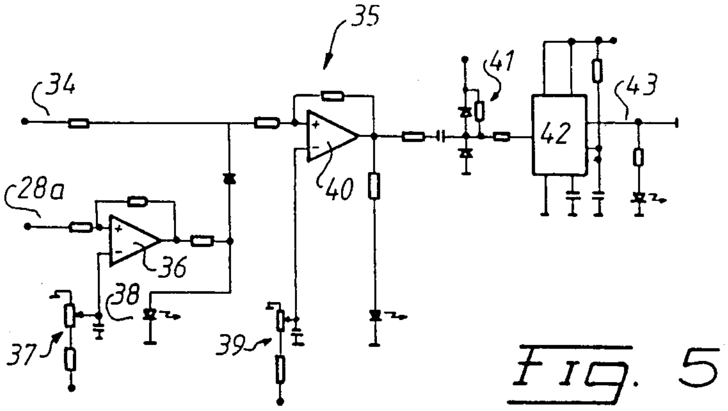
FIG. 5 illustrates diagrammatically a signal computing circuit used for producing momentarily occurring high signal values which can be utilized for establishing a transition from one object to another object.

FIG. 5 illustrates an arithmetical circuit 35 which is intended to produce a well defined output pulse at that point where one object merges with another object, when the objects are positioned in fishscale formation.

There is used to this end an amplifier 36 which can be controlled, via a circuit 37, in a manner which prevents the circuit from functioning beneath a given level. This is shown by energization of a photodiode 38 to its active state.

Furthermore, a circuit 39 is provided for adjusting the level at which detection takes place, this circuit being connected to an amplifier 40. The amplifier 40 is connected, via a circuit 41, to a multivibrator 42 which is intended to transmit a pulse on a conductor 43 when a new detectable object appears in the light beam.

Figure 6:
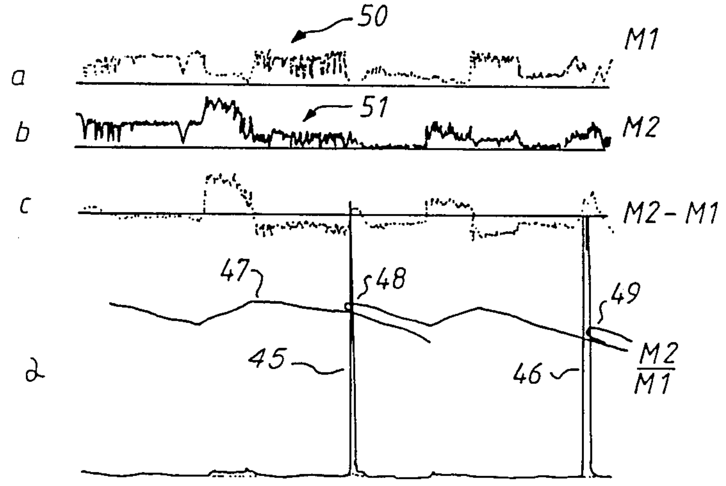
FIG. 6 illustrates time-divided signal variations when using an electric control arrangement according to the invention for counting the number of newspapers oriented in fishscale formation, with the upper surface of the newspapers exhibiting a print which could readily be confused with a transition from one object to another object.

Finally, FIG. 6 illustrates a series of curve forms, in which curve "a" illustrates the temporal variations in the significant signal M1. The curve form "b" illustrates the temporal variations in the significant signal M2 occurring on the conductor 28a, whereas the curve form "c" signifies the difference between the first and second significant signals M2 and M1.

The curve form "d" illustrates the signal produced on the conductor 34, via the arithmetical circuit shown in FIG. 4, and shows specifically the high voltage peaks 45 and 46 utilized for establishing the transition from one object to another.

It will clearly be seen from FIG. 6 that variations (illustrated at sections 50 and 51 of respective curves a and b) in the print pattern on the upper surface of the newspapers, which constitute said objects to be counted, are compensated out to some extent when these signals are drawn from one another, although the transition from one object to another becomes particularly pronounced when the signal is divided instead.

For the sake of clarity, FIG. 6d also shows the profile 47 of the objects to be counted, in this case a plurality of newspapers arranged in overlapping, fishscale relationship. The transition junction from one newspaper to another is referenced 48 and 49.

It will be understood that the invention is not restricted to the described and illustrated exemplifying embodiment, and that modifications can be made within the scope of the following claims.

We claim:

1. An electric control arrangement for an object detecting system comprising:

a light source for transmitting light beams in a direction in which an object to be detected can be expected to appear, said light source transmitting light beams having a high intensity and having a low intensity with the intensity of the light beams varying in time, at least one receiving means for receiving light beams reflected by a detected object, each said receiving means being activated to receive reflected light beams during those periods in which the light source transmits light beams of high intensity and also during those time periods in which the light source transmits light beams of low intensity, driving means for driving said light source to transmit light beams having an intensity that varies in time and arranged to produce a trigger pulse to activate each said receiving means to receive reflected light beams, and means for detecting and evaluating the presence of said object in response to variations occurring in the received reflected light beams as a result of relative movement between the object to be detected and light beams transmitted by the light source, wherein signals obtained from the received light beams of high intensity and low intensity are combined, said means for detecting and evaluating the presence of said object including means for producing a respective true-phase signal and a respective phase-shifted signal that is phase-shifted through 180° corresponding to the light beams received by a respective said receiving means and including means for adding together said respective true phase signal and said respective phase-shifted signal corresponding to reflected light beams received by a respective said receiving means to produce a corresponding addition signal, said means for adding including a first input means for receiving said respective true phase signal and a second input means for receiving said respective phase-shifted signal, wherein said respective true-phase signal and said respective phase-shifted signal are added together in dependence on the state of the respective first and second input means with said first and second input means being selectively actuable by a trigger pulse produced by said driving means.

2. The electric control arrangement as set forth in claim 1 wherein said signals obtained from the received light beams of high intensity and low intensity are combined so as to produce a signal differential that is bandwidth restricted.

3. The electric control arrangement for an object detecting system as set forth in claim 1 wherein the light source is adapted for periodic intensity variation.

4. The electric control arrangement for an object detecting system as set forth in claim 1 wherein the light source is a light emitting diode.

5. The electric control arrangement for an object detecting system as set forth in claim 1 wherein said means for detecting and evaluating the presence of said object is an electrical means.

6. The electric control arrangement for an object detecting system as set forth in claim 1 wherein said means for detecting and evaluating the presence of said object is an electronic means.

7. The electric control arrangement for an object detecting system as set forth in claim 1 wherein said means for detecting and evaluating the presence of said object includes electrical means and electronic means.

8. The electric control arrangement for an object detecting system as set forth in claim 1 wherein said means for adding includes an integrating means for integrating the combination of said respective true phase signal and said respective phase-shifted signal.

9. The electric control arrangement for an object detecting system as set forth in claim 1 wherein said driving means includes a multivibrator which transmits pulses of a frequency in a range of from about 500 Hz to about 500 kHz.

10. The electric control arrangement for an object detecting system as set forth in claim 1 wherein said driving means includes a multivibrator which transmits pulses having a frequency of about 30 kHz.

11. The electric control arrangement for an object detecting system as set forth in claim 1 wherein said electric control arrangement includes a first receiving means and a second receiving means for receiving light beams reflected by a detected object, and wherein said means for detecting and evaluating the presence of said object includes a first means for producing a true-phase signal and a phase-shifted signal that is phase shifted through 180° corresponding to the reflected light beams received by said first receiving means and a second means for producing a true phase signal and a phase-shifted signal that is phase shifted through 180° corresponding to the reflected light beams received by said second receiving means, and wherein said means for detecting and evaluating the presence of said object includes a first addition means for adding together said true phase signal and said phase shifted signal corresponding to reflected light beams received by said first receiving means to produce a corresponding first addition signal and a second addition means for adding together said true phase signal and said phase-shifted signal corresponding to reflected light beams received by said second receiving means to produce a corresponding second addition signal, wherein said first addition means includes a first addition first input means for receiving said respective true phase signal and a first addition second input means for receiving said respective phase-shifted signal wherein said respective true phase signal and said respective phase-shifted signal are added together in dependence on the state of the respective first addition first input means and the first addition second input means with the first addition first input means and the first addition second input means being selectively actuable by a trigger pulse produced by said driving means, and wherein said second addition means includes a second addition first input means for receiving said respective true phase signal and a second addition second input means for receiving said respective phase-shifted signal wherein said respective true phase signal and said respective phase-shifted signal are added together in dependence on the state of the respective second addition first input means and the second addition second input means with the second addition first input means and the second addition second input means being selectively actuable by a trigger pulse produced by said driving means.

12. The electric control arrangement for an object detecting system as set forth in claim 11 wherein said first addition means includes a first integrating means for integrating the combination of said respective true phase signal and said respective phase-shifted signal corresponding to the reflected light beams received by said first receiving means, and wherein said second addition means includes a second integrating means for integrating the combination of said respective true phase signal and said respective phase-shifted signal corresponding to the reflected light beams received by said second receiving means.

13. The electric control arrangement for an object detecting system as set forth in claim 12 wherein said first and second addition signals are divided in a signal computing circuit.

14. The electric control arrangement for an object detecting system as set forth in claim 13 wherein a signal corresponding to said division of said first and second addition signals exhibits at certain times high values which are utilized to establish a transition from one detected object to another detected object.

15. The electric control arrangement for an object detecting system as set forth in claim 14 wherein said means for detecting and evaluating the presence of said object is an electrical means.

16. The electric control arrangement for an object detecting system as set forth in claim 14 wherein the means for detecting and evaluating the presence of said object is an electronic means.

17. The electric control arrangement for an object detecting system as set forth in claim 14 wherein said means for detecting and evaluating the presence of said object includes electrical means and electronic means.

18. The electric control arrangement for an object detecting system as set forth in claim 11 wherein said driving means includes a multivibrator which transmits pulses having a frequency in a range of from about 500 Hz to about 500 kHz.

19. The electric control arrangement for an object detecting system as set forth in claim 11 wherein said driving means includes a multivibrator which transmits pulses having a frequency of about 30 kHz.

20. The electric control arrangement for an object detecting system as set forth in claim 11 wherein said light source is a light emitting diode.

* * * * *